(12) United States Patent
Pearlstein et al.

(10) Patent No.: US 8,306,122 B2
(45) Date of Patent: Nov. 6, 2012

(54) METHOD AND APPARATUS FOR PROCESSING IMAGE DATA

(75) Inventors: Larry Pearlstein, Newtown, PA (US); Richard K. Sita, Audubon, NJ (US)

(73) Assignee: Broadcom Corporation, Irvine, CA (US)

( * ) Notice: Subject to any disclaimer, the term of this patent is extended or adjusted under 35 U.S.C. 154(b) by 1026 days.

(21) Appl. No.: 12/144,018

(22) Filed: Jun. 23, 2008

(65) Prior Publication Data

US 2009/0316041 A1    Dec. 24, 2009

(51) Int. Cl.
*H04N 7/12* (2006.01)
*H04N 11/02* (2006.01)
*H04N 11/04* (2006.01)

(52) U.S. Cl. ................ 375/240.16; 348/390.1

(58) Field of Classification Search ............ None
See application file for complete search history.

(56) References Cited

U.S. PATENT DOCUMENTS

| | | | |
|---|---|---|---|
| 6,748,017 B1* | 6/2004 | Joung | 375/240.16 |
| 2007/0133686 A1* | 6/2007 | Lee et al. | 375/240.16 |
| 2008/0095241 A1* | 4/2008 | Amon et al. | 375/240.24 |
| 2009/0257500 A1* | 10/2009 | Karczewicz et al. | 375/240.16 |

* cited by examiner

*Primary Examiner* — Xavier Szewai Wong
(74) *Attorney, Agent, or Firm* — Thomas | Horstemeyer, LLP

(57) ABSTRACT

A method and apparatus of processing image data comprises receiving a video data signal where each pixel is represented by one or more digitized components, each digitized component being represented by a first set of binary digits and a second set of binary digits. The first set of binary digits is stored in a first memory plane and the second set of binary digits is stored in a second memory plane. The first set of binary digits is extracted and undergoes first and second processing. The second set of binary digits is extracted and undergoes second processing.

26 Claims, 3 Drawing Sheets

METHOD AND APPARATUS FOR PROCESSING IMAGE DATA

FIELD OF INVENTION

The present invention is directed to image data processing. More particularly, the present invention is directed to a method and apparatus for processing image data represented by multi-bit values in a binary number system.

BACKGROUND

In data image processing, it is sometimes necessary to perform a frame rate conversion. For example, a video may be recorded at a frequency of 24 Hertz (Hz), but a display that will be utilized to display the video may operate at a different frequency, such as 50 or 60 Hz. In order to properly display this video, frame rate conversion, which may include computing intermediate frames, is sometimes employed.

With the advent of high definition (HD) video, and HD liquid crystal displays (LCDs), the utilization of frame rate conversion becomes even more important. Since LCDs are often backlit by cold cathode fluorescent lamps (CCFLs), they are lit more continuously than a traditional cathode ray tube (CRT), which utilizes a stroboscopic method of lighting the screen. Because a video image displayed on an LCD that is continuously backlit may appear blurry to a human eye, frame rate conversion based on motion compensation may be employed to correct this.

Currently, this may be performed by storing a video image input data in a memory where it can be extracted and have video processing performed upon it. However, current systems for video processing store image data with high precision, even though some aspects of the video processing system do not require high precision processing. For example, an HD video signal may require 10 bits to create a suitably accurate representation of each image for high quality reproduction. However some aspects of the video processing system may only require 8 bits of image precision in order to perform satisfactorily. It would therefore be beneficial to provide a method and apparatus that could efficiently store and process a image data signal with both high precision and lower precision.

SUMMARY

A method and apparatus to enable efficient processing of image data with both high precision and lower precision is disclosed. The method comprises receiving a video data signal where each pixel is represented by one or more digitized components, each digitized component being represented by a first set of binary digits and a second set of binary digits. The first set of binary digits is stored in a first memory plane and the second set of binary digits is stored in a second memory plane. The first set of binary digits is extracted and undergoes first and second processing. The second set of binary digits is extracted and undergoes second processing.

DETAILED DESCRIPTION

The present invention relates to a method and apparatus for processing image data represented by multi-bit values in a binary number system. More particularly, the present invention relates to processing video data that may be considered to include an integer and fractional component.

Figure 1:
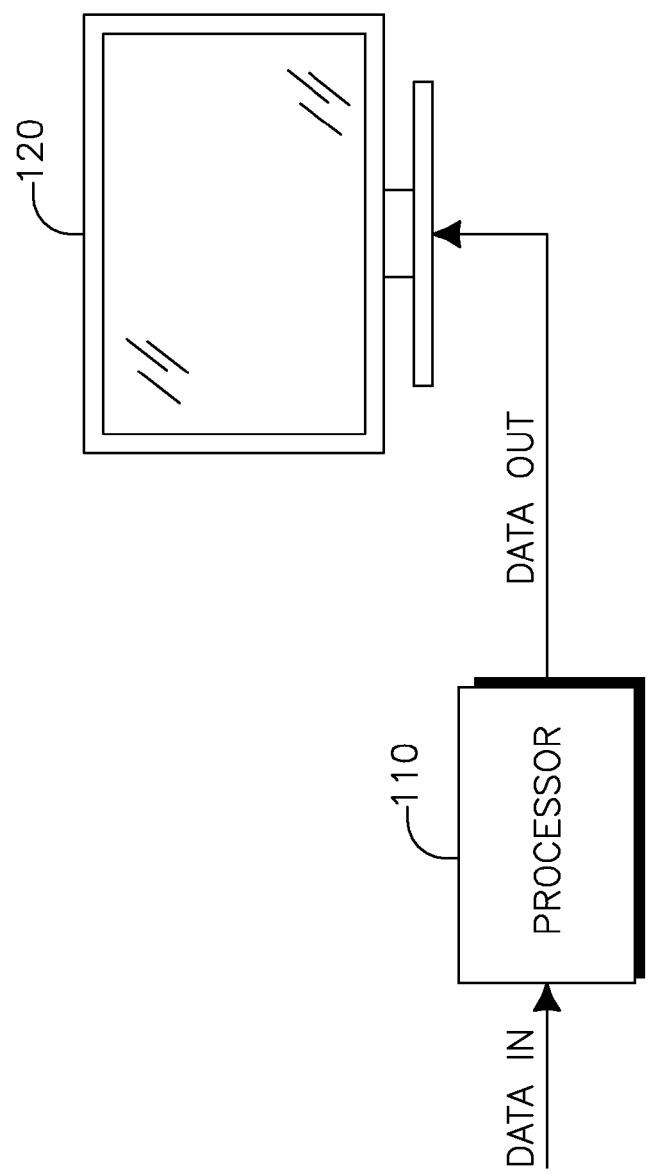
FIG. 1 is a functional block diagram of an apparatus for processing image data including a processor and a display.

FIG. 1 is a functional block diagram of an apparatus 100 for processing image data including a processor 110 and a display 120. As shown in FIG. 1, the processor 110 is configured to receive image data in and produce a processed image data out. This processed image data out may be forwarded to the display 120 where it may be viewed and utilized.

Figure 2:
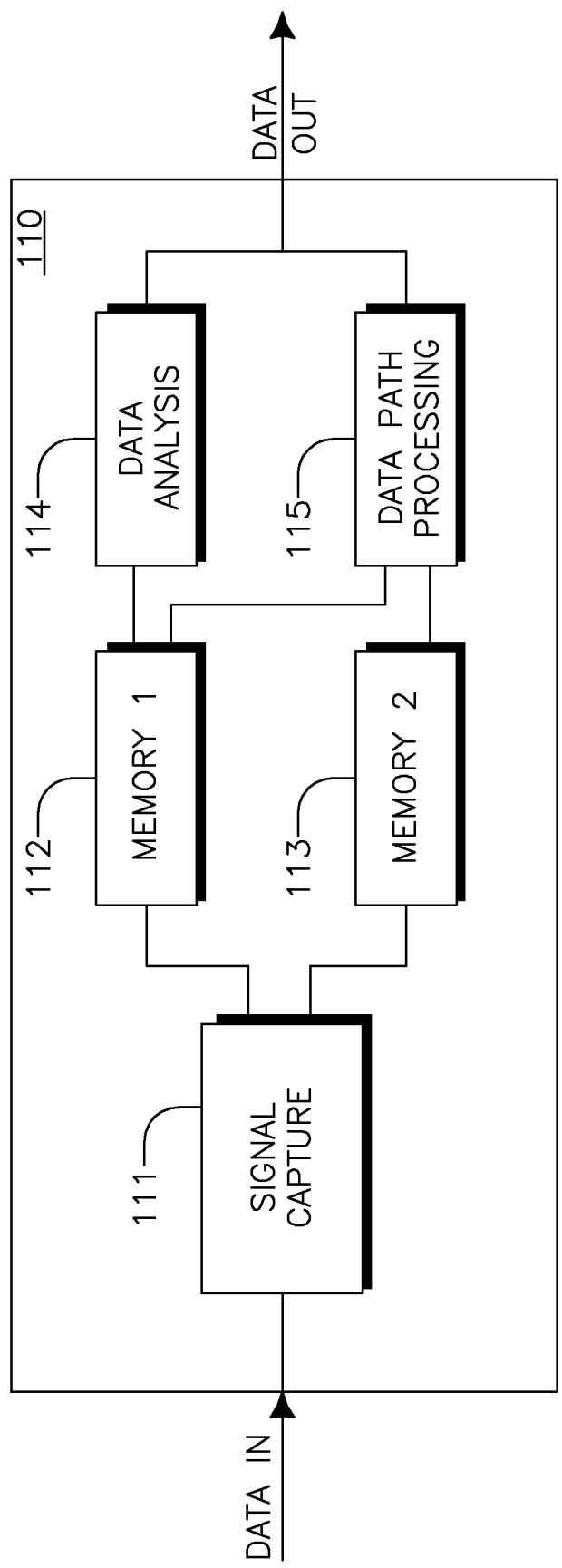
FIG. 2 is a functional block diagram of the processor of FIG. 1.

FIG. 2 is a functional block diagram of the processor 110 of FIG. 1. The processor 110 includes a signal capture block 111, a first memory location plane 112 (designated Memory1) in communication with the signal capture block 111, a second memory location plane 113 (designated Memory2) in communication with the signal capture block 111, a data analysis block 114 in communication with the first memory location plane 112, and a data path processing block 115 in communication with both the first and second memory location planes 112 and 113, respectively. The data received by the signal capture block 111 is, in one example, video image data that may include a first and second component.

Although the steps performed by each functional block of the processor 110 will be described in more detail below, briefly, the signal capture block 111 analyzes the received data to determine whether or not it contains more than set of binary digits associated with a component. If the data contains more than one set of binary digits associated with a component, then a first set of binary digits associated with a first component is stored in the first memory location plane 112 for extraction later, while a second set of binary digits associated with a second component is stored in the second memory location plane 113. The data analysis block 114 extracts the set of binary digits associated with the first component from the first memory location plane 112 and performs processing on the set of binary digits associated with the first component. For example, where the set of binary digits associated with the first component includes video data, the data analysis block 114 may perform motion estimation and/or motion vector assignment operations on the set of binary digits associated with the first component.

The data path processing block 115 extracts the set of binary digits associated with the first component from the first memory location plane 112 and the second data component from the second memory location plane 113 and processes the set of binary digits associated with the first and second data components, respectively. For example, where the first and second data components include video data, the data path processing block 115 may perform motion compensation on the first and second data components, in addition to various post-processing functions such as filtering, and the like. After processing, both the first and second data components may be combined and/or transferred to the display 120 of the apparatus 100.

The first memory location plane 112 may include an area of contiguous bytes in memory that can be accessed quickly and efficiently to process the data contained in them. In addition, the first memory location plane 112 may include predefined memory locations that may be known by the signal capture block 111, data analysis block 114, and data path processing block 115 for storage and extraction.

The second memory location plane 113 may include an area of contiguous bytes in memory that can be accessed quickly and efficiently to process the data contained in them.

In addition, the second memory location plane 113 may include predefined memory locations that may be known by the signal capture block 111, data analysis block 114, and data path processing block 115 for storage and extraction.

Figure 3:
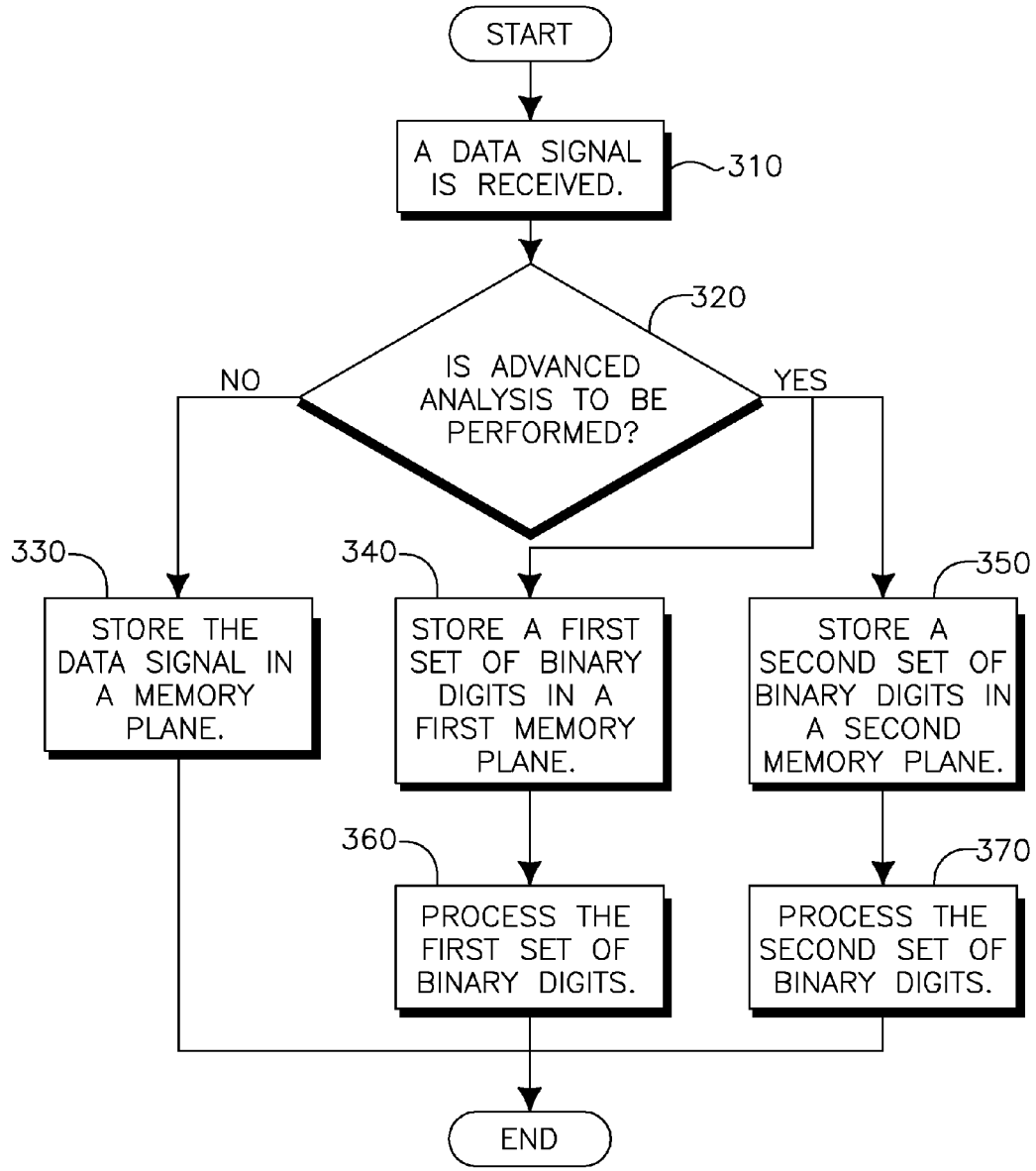
FIG. 3 is a flow diagram of a method for processing image data.

FIG. 3 is a method 300 for processing image data in accordance with the present invention. In step 310, a data signal is received. In one example, the data signal may include a video input signal. The data signal is analyzed to determine whether advanced analysis should be performed (step 320), based upon whether each pixel is represented by one or more digitized components, with each digitized component being represented by a first set of binary digits and a second set of binary digits. For example, an HD video signal may include a set of binary digits associated with a first component, such as an integer component which may be contained in the first 8 bits of a video signal, and a set of binary digits associated with a second component, such as a fractional component which may be contained in additional bits beyond the first 8.

If it is determined in step 320 that no advanced analysis is to be performed on the data signal, then the data may be stored in a memory plane (step 330) for processing further. In this case, the data may be processed in an ordinary fashion.

However, if it is determined in step 320 that advanced analysis is to be performed, then different components of the data signal may be stored and processed differently. If this is the case, then the set of binary digits associated with the first component is stored in a first memory plane (step 340) and the set of binary digits associated with the second component is stored in a second memory plane (step 350). Using the example of an HD video signal that contains a set of binary digits associated with the first component that is an integer component and a set of binary digits associated with the second component that is a fractional component, the integer component might be stored in the first memory plane and the fractional component might be stored in the second memory plane. Additionally, the integer component may include the most significant bits, (e.g., first 8 bits), of a video signal, while the fractional component may include the least significant bits, (e.g., 8+N bits), of the video signal. In one example, the integer bits may be stored in adjacent, or contiguous, address areas in memory so as to provide more efficient access to them, while the fractional bits are stored in another group of adjacent, or contiguous, address areas in memory. It should be noted, again, however, that the first or second memory planes may also include non-adjacent, non-contiguous memory areas, but instead a set of memory addresses that may be pre-defined.

The stored sets of binary digits associated with the first and second data components may be extracted for processing when required. In step 360, the set of binary digits associated with the first component is processed. In one example, the set of binary digits associated with the first component may undergo motion estimation and/or motion vector assignment. This processing, for purposes of example, may be referred to as "first processing". In addition, the set of binary digits associated with the first component may undergo motion compensation processing and/or post-processing, such as filtering, and the like. This processing may be referred to, for purposes of example, as "second processing". The set of binary digits associated with the second component is processed in step 370, and in one example the processing may include motion compensation processing and/or post-processing, such as filtering, and the like.

Both processed sets of binary digits may then be forwarded to a display, such as the display 120 of the apparatus 100 of FIG. 1. In one embodiment, the display 120 may include an HD LCD display capable of displaying both low performance video, as may be contained in the set of binary digits associated with the first component of the data signal and full precision video, which may be contained in the set of binary digits associated with the second component of the data signal.

Additional processing to the data signal may include the use of a rounding operation applied to pixels of a video that are contained in, for example, the most significant bits of the data signal. An inverse un-rounding operation may then be applied when recombining the rounded values of the most significant bits to the least significant bits of each pixel value. In this manner, the original pixels may be reconstructed at full precision including motion compensation.

In addition, although the apparatus 100 and method 300 described above have been described in relation to an example where the data signal includes a video data signal, it should be noted that various other data signals may be included and processed in accordance with the method 300. For example, de-interlacing processes, super-resolution processing, noise reduction, and the like, may be processed in accordance with the method 300 described above and by the apparatus 100. More particularly, the processor 110 of the apparatus 100 may perform any of the described processing.

Although the features and elements of the present invention are described in the example embodiments in particular combinations, each feature or element can be used alone without the other features and elements of the example embodiments or in various combinations with or without other features and elements of the present invention. The present invention may be implemented in a computer program or firmware tangibly embodied in a computer-readable storage medium having machine readable instructions for execution by a machine, a processor, and/or any general purpose computer for use with or by any non-volatile memory device. Suitable processors include, by way of example, both general and special purpose processors.

Typically, a processor will receive instructions and data from a read only memory (ROM), a RAM, and/or a storage device having stored software or firmware. Storage devices suitable for embodying computer program instructions and data include all forms of non-volatile memory, including by way of example semiconductor memory devices, read only memories (ROMs), magnetic media such as internal hard disks and removable disks, magneto-optical media, and optical media such as CD-ROM disks and digital versatile disks (DVDs). Types of hardware components, processors, or machines which may be used by or in conjunction with the present invention include Application Specific Integrated Circuits (ASICs), Field Programmable Gate Arrays (FPGAs), microprocessors, or any integrated circuit.

What is claimed is:
1. A method of processing image data, comprising:
receiving a video data signal embedded with a plurality of pixel representations where each pixel is represented by one or more digitized components, each digitized component being represented by a first set of binary digits embedded in the video data signal and a second set of binary digits embedded in the video data signal, wherein the first set of binary digits provides a first representation of a pixel value at a first bit level of precision and the second set of binary digits in combination with the first set of binary digits provides a second representation of the same pixel value at a second bit level of precision that is different than the first bit level of precision;
storing the first set of binary digits associated with a first component in a first memory plane;

storing the second set of binary digits associated with a second component in a second memory plane;

extracting the first set of binary digits and performing first and second processing on the first set of binary digits; and extracting the second set of binary digits and performing second processing on the second set of binary digits.

2. The method of claim 1 wherein the first component associated with the first set of binary digits is an integer component of the video data signal.

3. The method of claim 1 wherein the second component associated with the second set of binary digits is a fractional component of the video data signal.

4. The method of claim 1 wherein the first memory plane includes a plurality of adjacent memory addresses.

5. The method of claim 1 wherein the second memory plane includes a plurality of adjacent memory addresses.

6. The method of claim 1 wherein the first processing includes performing motion estimation on the first set of binary digits.

7. The method of claim 1 wherein the first processing includes performing a motion vector assignment on the first set of binary digits.

8. The method of claim 1 wherein the second processing includes performing motion compensation on the first and second sets of binary digits.

9. The method of claim 8 wherein the second processing further includes performing post-processing.

10. The method of claim 9 wherein post-processing includes filtering.

11. A processor for processing image data, the processor comprising:

a signal capture block configured to receive the image data and extract a first set of binary digits associated with a first component and second set of binary digits associated with a second component from the image data, wherein the first set of binary digits and the second set of binary digits are embedded in the image data, wherein the first set of binary digits provides a first representation of a pixel value at a first bit level of precision and the second set of binary digits in combination with the first set of binary digits provides a second representation of the same pixel value at a second bit level of precision that is different than the first bit level of precision;

a first memory location plane in communication with the signal capture block, the first memory location plane configured to receive and store the first set of binary digits of the image data; and a second memory location plane in communication with the signal capture block, the second memory location plane configured to receive and store the second set of binary digits of the image data.

12. The processor of claim 11, further comprising a data analysis block in communication with the first memory location plane, the data analysis block configured to extract the first set of binary digits and perform a first processing on the first set of binary digits.

13. The processor of claim 12 wherein the first processing includes performing motion estimation on the first set of binary digits.

14. The processor of claim 12 wherein the first processing includes performing a motion vector assignment on the first set of binary digits.

15. The processor of claim 12, further comprising a data path processing block in communication with both the first and second memory location planes, the data path processing block configured to extract the first and second sets of binary digits and perform a second processing on the first and second sets of binary digits.

16. The processor of claim 15 wherein the second processing includes performing motion compensation on the first and second sets of binary digits.

17. The processor of claim 16 wherein the second processing further includes performing post-processing.

18. The processor of claim 17 wherein post-processing includes filtering.

19. The processor of claim 11 wherein the first memory location plane includes a plurality of adjacent memory addresses.

20. The processor of claim 11 wherein the second memory location plane includes a plurality of adjacent memory addresses.

21. The processor of claim 11 wherein the first memory location plane includes a plurality of pre-defined memory addresses.

22. The processor of claim 21 wherein the second memory location plane includes a plurality of pre-defined memory addresses.

23. The processor of claim 11 wherein the first component associated with the first set of binary digits is an integer component of a video data signal.

24. The processor of claim 11 wherein the second component associated with the second set of binary digits is a fractional component of a video data signal.

25. A non-transitory computer-readable storage medium containing a set of instructions executable by a processor, the set of instructions comprising:

a video data receiving code segment for receiving a video data signal embedded with a plurality of pixel representations where each pixel is represented by one or more digitized components, each digitized component being represented by a first set of binary digits embedded in the video data signal and a second set of binary digits embedded in the video data signal, wherein the first set of binary digits provides a first representation of a pixel value at a first bit level of precision and the second set of binary digits in combination with the first set of binary digits provides a second representation of the same pixel value at a second bit level of precision that is different than the first bit level of precision;

a first storage code segment for storing the first set of binary digits associated with a first component in a first memory plane;

a second storage code segment for storing the second set of binary digits associated with a second component in a second memory plane;

a first extracting code segment extracting the first set of binary digits and performing first and second processing on the first set of binary digits; and a second extracting code segment for extracting the second set of binary digits and performing second processing on the second set of binary digits.

26. A non-transitory computer-readable storage medium containing a set of instructions, the set of instructions comprising:

a video data receiving code segment for receiving a video data signal embedded with a plurality of pixel representations where each pixel is represented by one or more digitized components, each digitized component being represented by a first set of binary digits embedded in the video data signal and a second set of binary digits embedded in the video data signal, wherein the first set of binary digits provides a first representation of a pixel value at a first bit level of precision and the second set of binary digits in combination with the first set of binary digits provides a second bit representation of the same pixel value at a second bit level of precision that is different than the first bit level of precision;

a first storage code segment for storing the first set of binary digits associated with a first component in a first memory plane;

a second storage code segment for storing the second set of binary digits associated with a second component in a second memory plane;

a first extracting code segment extracting the first set of binary digits and performing first and second processing on the first set of binary digits; and a second extracting code segment for extracting the second set of binary digits and performing second processing on the second set of binary digits.

* * * * *